United States Patent [19]

Perahia

[11] 4,425,534
[45] Jan. 10, 1984

[54] LINEAR MOTOR VELOCITY SENSOR

[75] Inventor: Avraham Perahia, San Jose, Calif.

[73] Assignee: Pertec Computer Corporation, Los Angeles, Calif.

[21] Appl. No.: 325,107

[22] Filed: Nov. 27, 1981

Related U.S. Application Data

[63] Continuation of Ser. No. 13,480, Feb. 21, 1979, Pat. No. 4,291,593.

[51] Int. Cl.$^3$ .................. H02K 33/12; H02K 41/02
[52] U.S. Cl. ................................. 318/135; 310/12
[58] Field of Search ................ 310/12, 15, 14, 27; 318/135, 132, 128

[56] References Cited

U.S. PATENT DOCUMENTS

| | | | |
|---|---|---|---|
| 2,776,560 | 1/1957 | Erath et al. | 310/13 |
| 3,452,259 | 6/1969 | Shtrikman | 310/13 |
| 3,470,399 | 9/1969 | Johnson et al. | 310/13 |
| 3,659,124 | 4/1972 | Lathrop | 310/13 |
| 3,872,333 | 3/1975 | Imbert et al. | 310/27 |

*Primary Examiner*—J. V. Truhe
*Assistant Examiner*—A. Evans
*Attorney, Agent, or Firm*—Freilich, Hornbaker, Wasserman, Rosen & Fernandez

[57] ABSTRACT

A velocity sensing method and apparatus to be used in conjunction with a linear motor having a moveable voice coil. More particularly, an apparatus is disclosed whereby a velocity sensing loop is positioned on a surface defined by wire windings of a linear motor voice coil. The velocity sensing loop is configured so that an end portion is perpendicular to the longitudinal axis of the voice coil and two side portions are parallel to the longitudinal axis of the voice coil. As the end portion of the velocity sensing loop traverses a magnetic field with which the voice coil reacts for positioning thereof, a voltage is induced within the velocity sensing loop which is proportional to the velocity of the loop as it passes through the magnetic field. This voltage can be used in conjunction with a feedback loop to control current through, and thus velocity of, the voice coil, thereby providing a means by which velocity of the voice coil can be maintained within predetermined limits during the time that the velocity sensing loop is passing through the magnetic field. The apparatus is believed to be especially useful for head positioning in magnetic disk memory systems by providing a means whereby velocity of the head as it approaches a disk surface can be controlled without use of an external velocity transducer.

4 Claims, 8 Drawing Figures

LINEAR MOTOR VELOCITY SENSOR

This is a continuation of application Ser. No. 013,480 filed Feb. 21, 1979, now U.S. Pat. No. 4,291,593.

FIELD OF THE INVENTION

This invention relates to velocity measurement devices and more particularly to velocity measurement devices used in conjunction with linear motors.

BACKGROUND OF THE INVENTION

Linear motors have been used for many years as positioning devices. For many applications, it is important that the linear motor accomplish its positioning function at a predetermined velocity, or within predetermined velocity limits. An example of such an application is in positioning of a read/write head of a magnetic disk memory system, the head having to approach a rotating disk face at a velocity lying between predetermined velocity limits. Once the head is located adjacent to the disk surface, velocity information can be read by the head from the disk surface and utilized to control head velocity across the disk surface. However, if the head is not adjacent to the disk surface, velocity information must be obtained by another means. Conventional systems utilize an external velocity transducer which is connected either to a voice coil of the linear motor, or to a transducer-containing structure which is moving in proportion to the velocity of the voice coil. The velocity transducer provides a feedback signal to the voice coil driver thereby maintaining the velocity of the voice coil within predetermined limits.

Conventional devices to provide a voltage proportional to velocity of a linear motor voice coil typically consist of a separate electromagnetic type velocity transducer mounted in some way so that it attaches to a structure which moves in proportion to movement of the voice coil. The stationary part of the velocity transducer is typically fixed with respect to the structure to which the linear motor is mounted. Disadvantages of a separate velocity transducer include both cost and mechanical complexicies. A separate transducer is relatively expensive with respect to the total cost of a linear motor. In addition, mechanical resonances within the transducer itself and mass added to the structure being moved by the linear motor are both undesirable side effects of a separate velocity transducer, and sometimes mask the actual velocity of the voice coil. These resonances sometimes move oppositely with respect to the actual movement of the voice coil thereby resulting in a velocity indication from the velocity transducer which is not representative of the actual movement of the voice coil itself. Although disadvantages associated with conventional methods of determining velocity can be largely eliminated by presently known techniques, all of them increase the weight to be moved by the linear motor voice coil and result in increased cost. The present invention discloses an apparatus whereby velocity of the linear motor voice coil over a predetermined portion of its travel can be determined without use of a velocity transducer physically separate from the voice coil or the addition of a significant weight to the mechanism being moved by the voice coil.

SUMMARY OF THE INVENTIODN

In accordance with the present inention, a loop of wire is physically carried by a voice coil structure of a linear motor for movement therewith. The voice coil is supported in a magnetic field and mounted so that a current driven through the voice coil develops a force on the voice coil to move it linearly. Movement of the wire loop through the magnetic field will induce a voltage across the terminals of the loop indicative of the velocity of the coil movement.

A typical linear motor has an elongated central member of substantially uniform cross-section and an elongated voice coil having a plurality of wire windings each of which defines a plane substantially perpendicular to the longitudinal axis of the voice coil. The voice coil defines a longitudinally extending inner bore of substantially uniform cross-section which is slidably received by the elongated central member. A magnetic field extends outwardly from a portion of the elongated central member outer surface so that interaction between a magnetic field created by current through the voice coil and the outwardly extending magnetic field will cause the voice coil to be slidably positioned along the elongated central member. A voice coil velocity sensing means is provided which comprises at least one velocity sensing loop having two end terminals, the sensing loop being carried by the voice coil. The velocity sensing loop is positioned with respect to the voice coil so that the magnetic field contained within an area defined by the loop will change during the time period that velocity information is desired.

The invention further discloses a means whereby voltages induced by mutual inductance within the velocity sensing loop due to current changes in the voice coil will be cancelled, thereby providing a voltage output only proportional to velocity of the voice coil. A further feature of the invention discloses two velocity sensing loops which are carried by the voice coil so that as they pass through the magnetic field one velocity sensing loop will experience an increase in magnetic flux contained within its respective enclosed area while the other is experiencing a decrease in magnetic flux contained within its enclosed area. The two velocity sensing loop end terminals are interconnected so that voltages proportional to velocity are additive whereas voltages induced by current changes in the voice coil cancel each other, thereby providing a voltage output from the two-loop combination that is only proportional to velocity of the loops as they intersect the magnetic field.

DETAILED DESCRIPTION

As required, detailed illustrative embodiments of the invention are disclosed herein. These embodiments exemplify the invention and are currently considered to be the best embodiments for such purposes. However, it is to be recognized that other linear motor and velocity sensing loop configurations could be utilized. Accordingly, the specific embodiments disclosed are representative in providing a basis for the claims which define the scope of the present invention.

As previously explained, the present invention discloses a means for determining linear velocity of a voice coil of a linear motor over a predetermined portion of its travel range. Velocity is determined by one or more velocity sensing loops physically carried by the voice coil. As the velocity sensing loop passes through a constant magnetic field created by the linear motor, an output voltage developed between two sensing loop terminals is proportional to the velocity of the sensing loop. This output voltage can be utilized to partially control a current through the voice coil, thereby controlling its velocity.

Figure 1:
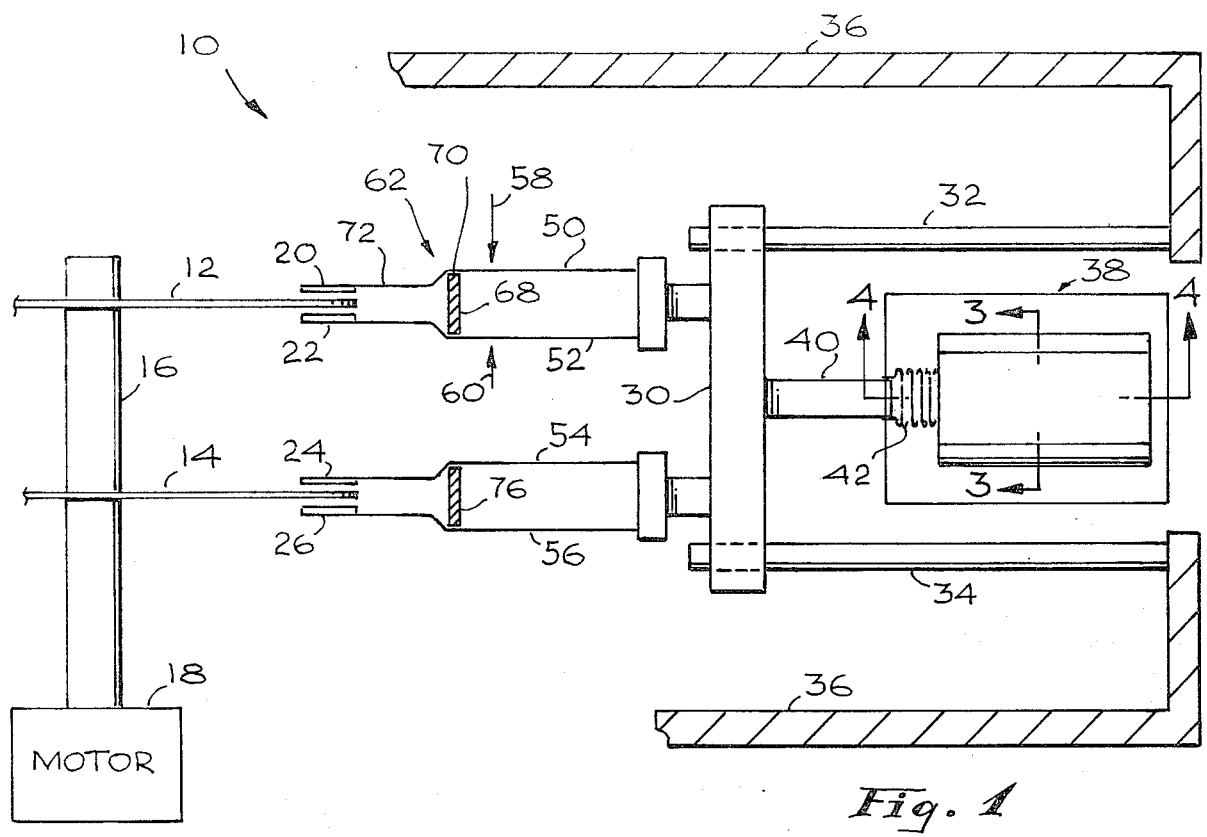
FIG. 1 is a plan view of a read/write head positioner for a disk memory drive system.

Referring now to FIG. 1, the basic elements of an apparatus utilizing the present invention can be seen. A disk memory device 10 comprises a first and second data-containing disk 12 and 14, respectively, centrally mounted on a spindle 16 which is rotated by a motor 18. Data is read from and recorded on the disks 12 and 14 by appropriately positioned first, second, third and fourth read/write heads 20, 22, 24, 26, the first and second heads 20 and 22 reading information from the first disk 12 and the third and fourth heads 24 and 26 reading information from the second disk 14. The heads 20, 22, 24, and 26 are radially positioned along the two disks 12 and 14 by a head positioning arm 30 which can be slidably positioned along a first and second guide rail 32 and 34 respectively, the guide rails 32 and 34 being fixedly attached to a housing structure 36. Movement of the head positioning arm 30 is effected by a linear motor 38 which linearly positions a connecting arm 40 in accordance with a driving current through a voice coil 42 to be explained in detail below. Thus, as one can appreciate, the head positioning arm 30 can be caused to slide along a path predetermined by the two guide rails 32 and 34 in accordance with the driving current provided to the voice coil 42. As the heads 20, 22, 24 and 26 become positioned adjacent to the rotating disks 12 and 14, an aerodynamic interaction between an airflow created by the rotating disks 12 and 14 and the heads 20, 22, 24 and 26 result in the heads being positioned immediately adjacent to but not touching their corresponding disks 12 and 14. This type of disk memory system is well known in the art and has been widely utilized for many years. Velocity and positioning information for the heads during the time in which they are immediately adjacent to the rotating disks is obtained from information contained on the disk surfaces. Each head 20, 22, 24, and 26 is connected to the head positioning arm 30 by a first, second third and fourth resilient holding arm 50, 52, 54 and 56, respectively, each of which exhibits a spring force in a direction such that each head held thereby will tend to be forced into its corresponding rotating disk surface. For example, the first head 20 is connected to the head positioning arm 30 by the first holding arm 50 which is formed of a resilient material. It is attached to the positioning arm 30 so that a spring force is present which tends to drive the first head 20 into the first disk 12 surface as represented by the arrow at 58. In a similar manner, the second head 22 is held by the second holding arm 52 which is also mounted to the positioning arm 30 so that a spring force represented by the arrow at 60 will tend to drive the second head 22 into the first disk 12 surface. The third head 24 and fourth head 26 are driven towards their corresponding disk surfaces in the same manner as above explained. Once the head becomes adjacent to the rotating disk, air flow created by the rapidly rotating disk aerodynamically reacts with the head structure thereby providing sufficient lift to overcome the disk-directing force within each holding arm which is tending to drive the head into the disk surface. By proper design the head can be made to "float" extremely close to the surface of the rotating disk without actually touching it, touching causing damage to both the head and disk surface.

In order to effect a proper positioning of each head 20, 22, 24, 26 with respect to its respective disk 12 and 14, it is essential that the head approach the rotating disk at a velocity between predetermined velocity limits. Approach of a head having a velocity outside the predetermined velocity limits will result in the head "crashing" into the disk surface. Positioning of the first head 20 with respect to the surface of the first disk 12 is effected by an offset 62 in the first holding arm 50. This offset 62, due to the resiliency of the holding arm 50, tends to be in sliding contact with a first positioning finger 68 attached to the housing structure 36. If the head positioning arm 30 is in the position shown in FIG. 1, the offset 62 lies between the first positioning finger 68 and the rotating disk 12 thereby allowing the first head 20 to assume a spaced-apart distance with respect to the disk 12 surface determined by the aerodynamic characteristic of the head 20 in conjunction with the air flow created by the rotating disk 12. A second position for the first holding arm 50 with respect to the first positioning finger 68, not shown in FIG. 1, occurs when the head positioning arm 30 is retracted, thereby resulting in the offset 62 being between the first positioning finger 68 and the head positioning arm 30. In this configuration, an end 70 of the first positioning finger 68 adjacent to the first holding arm 50 is in contact with a forward section 72 of the first holding arm 50, thereby preventing the first head 20 from approaching the first disk 12 surface. Thus, if the head positioning arm 30 is positioned as shown in FIG. 1, the first head 20 is spaced-apart with respect to disk 12 surface according to aerodynamic forces as previously explained. If the head positioning arm 30 is in a retracted position, the first head 20 is prevented from approaching the disk 12 surface by the forward section 72 of the first holding arm 50 abutting against the end 70 of the first positioning finger 68. Positioning of the second head 14 by the second holding arm 52 and the first positioning finger 68 is accomplished in a similar manner. A second positioning finger 76 interacts with the third holding arm 54 and the fourth holding arm 56 in an identical way.

Figure 2:
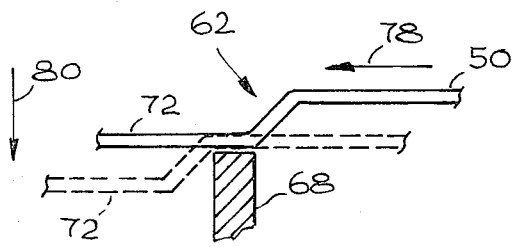
FIG. 2 is an enlarged cross-sectional view of the head positioning arm showing the offset with respect to the positioning finger.

Referring to FIG. 2, two positions of the offset 62 with respect to the first positioning finger 68 can be seen, the first position being the retracted position as shown by the solid lines and the second position being an extended position as shown by the dotted lines. As has been previously explained, the resilience of the first holding arm 50 will cause it to move from the position represented by the solid lines to that represented by the dotted lines as the offset 62 passes over the first positioning finger 68. As one can appreciate, the forward section 72 of the first holding arm 50 will have a velocity parallel to the disk 12 surface which is determined by the velocity of the head positioning arm 30, this velocity being represented by a parallel velocity vector shown at 78. The velocity at which the forward section 72 of the first holding arm 50, and thus the first head 20, approaches the disk 12 surface is determined by the magnitude of the parallel velocity vector 78 and the angle of the offset 62, a 90 degree offset angle resulting in a higher approach velocity than a 5 degree angle. The disk 12 approach velocity is represented by a normal velocity vector 80, normal referring to the angular relationship of the vector 80 with respect to the disk 12 surface. As previously explained, the normal velocity vector 80 must lie between certain predetermined velocity limits in order to prevent the head 20 from crashing into the disk 12 surface. If the first holding arm 50 is in the retracted position as shown by the solid lines of FIG. 2, velocity information normally obtainable from information contained on the disk 12 surface and read by the first head 20 is not available because the first head 20 is not close enough to read information from the disk 12 surface. Control of the normal velocity vector 80 can be effected by control of the parallel velocity vector 78, the control being needed only during that time when the offset 62 is in contact with the first positioning finger 68. Conventional systems obtain this velocity information by external transducers, some portion of which is fixedly attached to the head positioning arm 30. The present invention teaches a linear motor having a means to generate velocity information during the time that the offset 62 is passing over the first positioning finger 68.

Figure 3:
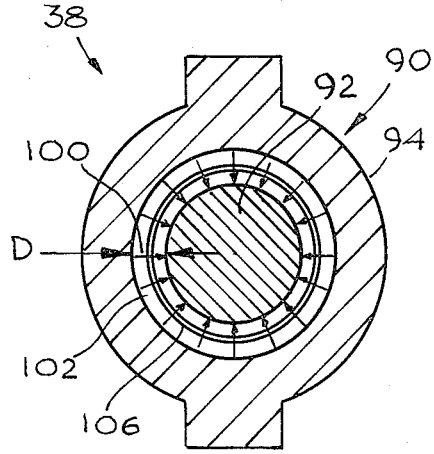
FIG. 3 is a cross-sectional view of the linear motor taken along line 3—3 of FIG. 1.
Figure 4:
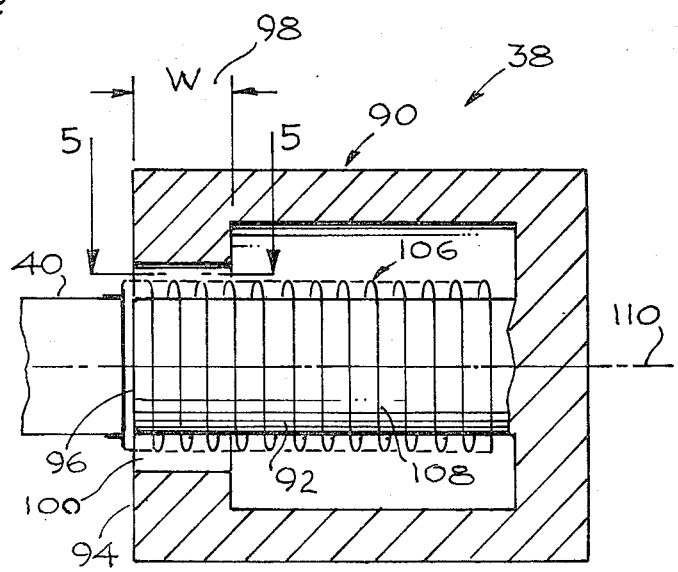
FIG. 4 is a cross-sectional view of the linear motor taken along line 4—4 of FIG. 1.

Referring now to FIGS. 3 and 4, one type of linear motor 38 is shown to illustrate the principles taught by the present invention. However other types of linear motors could also be utilized, the invention not being limited to any particular head positioning apparatus but rather being applicable to any system in which velocity over a relative short travel distance is desired, the parameters controlling travel distance to be explained below. The linear motor 38 comprises a magnet housing 90 having an elongated central member 92 about which is a centrally disposed annular ring 94. An outward end 96 of the elongated central member 92 forms one pole face of the magnet 90, the inner surface of the annular ring 94 forming the other pole face. The annular ring 94 has width W as represented at 98. The two pole faces of the magnet are spaced apart a predetermined distance D as shown at 100, this predetermined distance defining an air gap 100 in which is contained a magnetic field as represented at 102. Thus, one can appreciate that a cylindrically-shaped magnetic field is formed in the air gap 100, the field having a width W and a thickness D. A voice coil 106 formed by a plurality of wire windings 108 is slidably received over the elongated central member 92, the thickness of the coil 106 walls being less than that of the gap shown at 100. The windings 108 are formed so that each turn defines a plane that is substantially perpendicular to a longitudinal axis of the voice coil 106, the longitudinal axis being represented at 110. Current flowing through the voice coil 106 will react in conjunction with the magnetic field 102 present in the gap 100 so that the coil 106 will slidably move along the elongated central member 92, the direction being determined by the direction of current through the wire windings 108 and the polarity of the magnetic field 102 across the gap 100. The voice coil 106 is fixedly attached to the connecting arm 40 so that as the voice coil 106 is linearly displaced along the elongated central member 92, the head positioning arm 30 is similarly displaced.

Figure 5:
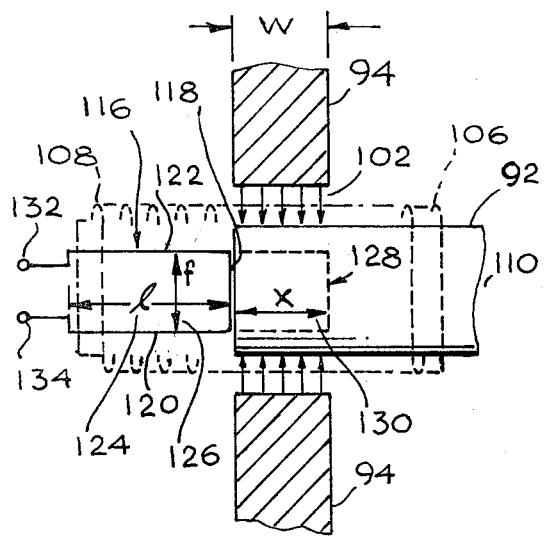
FIG. 5 is a diagramatic representation of a portion of the voice coil showing the velocity sensing loop and its relationship to the magnetic field created by the linear motor.

Voice coil 106 velocity information during the time the offset 62 is passing over the first positioning finger 68 is obtained by the apparatus illustrated in FIG. 5. The elongated central member 92, the annular ring 94, and the magnetic field 102 between them are shown. The contour, i.e., the peripheral surface, of the voice coil 106 and the wire windings 108 are schematically represented by dashed lines. According to a first feature of the invention, a velocity sensing loop 116 is physically mounted on the voice coil structure in a manner so that it follows the contour, i.e., lies on the peripheral surface, of the voice coil 106 thus defining a loop axis extending substantially perpendicular to the voice coil axis 110. Although a loop 116 having a single turn is shown, a loop having a plurality of turns could also be utilized. The velocity sensing loop 116 comprises a conductor formed to define an end portion 118 and two side portions 120 and 122. The end portion 118 is disposed so that it extends substantially perpendicular to the voice coil longitudinal axis 110 the two side portions 120 and 122 extend substantially parallel to the voice coil longitudinal axis 110. The length of the velocity sensing loop 116 is represented by the "l" as shown at 124, and the width is represented by "f" as shown at 126. As the voice coil 106 is slidably positioned along the elongated central member 92, the velocity sensing loop 116 will intersect the magnetic field 102. Basic magnetic theory teaches that the voltage produced across the terminals 132 and 134 of the velocity sensing loop 116 will be a function of the rate of change of the magnetic field or magnetic flux enclosed within the velocity sensing loop 116. The flux enclosed by the velocity sensing loop 116 will equal $(x)(f)(b_o)$, $b_o$ being the flux density in the gap 100 and x being the distance the loop 116 extends into the width W. Thus, the rate of change of flux enclosed by the velocity sensing loop 116 with respect to time will equal $(f)(b_o)(dx/dt)$, $dx/dt$, being the velocity of the voice coil 106. A solution of this equation will be approximately linear for values of "x" substantially greater than zero and substantially less than W, provided that "l" is much greater than W. Thus, if the offset 62 covers a linear distance less than that of W as shown in FIG. 5, and if the velocity sensing loop 116 is positioned so that its end portion 118 is within the annular ring width W prior to the time the offset 62 reaches the first positioning finger 68, and does not leave the width W until after the offset 62 has passed the first positioning finger 68, then the voltage present at the end terminals 132 and 134 will be proportional to the velocity of the velocity sensing loop 116 as it passes through the magnetic field 102. This is because the flux enclosed by the velocity sensing loop 116 is changing at a rate proportional to the velocity of the sensing loop 116. This relationship only holds so long as the sensing loop end portion 118 is passing through the width W which contains the magnetic field 102. If the end portion 118 has passed outside the width W, then the magnetic field 102 contained within the loop 128 as represented by the dotted lines will remain constant regardless of the velocity of the sensing loop 116. Therefore the linear distance of the offset 62 must be less than W. By appropriately positioning the velocity sensing loop 116 with respect to the voice coil 106 surface, the geometry can be chosen so that a changing voltage will be present at the end terminals 132 and 134 as the offset 62 passes over the first positioning finger 68. Voltages present at the velocity sensing loop 116 output terminals 132 and 134 can then be appropriately utilized to develop corrective signals to vary the current passing through the voice coil 106, thereby insuring that the voice coil 106 velocity is in fact maintained within predetermined limits.

Figure 6:
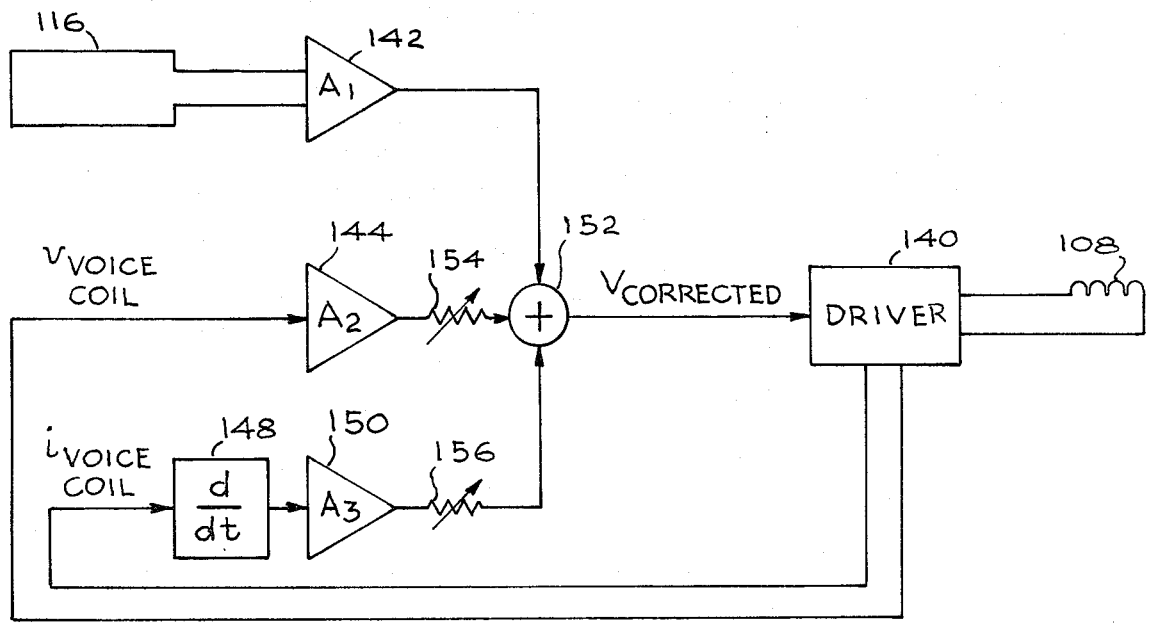
FIG. 6 is a block diagram showing a compensation network for cancelling voltages induced in the velocity sensing loop by current changes in the voice coil.

It has been found that the velocity sensing loop 116 may be subject to magnetic field changes resulting from current changes through the voice coil 106 as corrective signals are applied thereto. These field changes can produce undesirable voltages across the velocity sensing loop terminals 132 and 134 if it is not adequately shielded from the voice coil windings 108. Shielding can be effected in a number of ways well understood in the art. However, it has been found that summing of appropriately generated signals and the output voltage from the velocity sensing loop 116 will provide a corrected voltage which is only proportional to the velocity of the velocity sensing loop 116 through the magnetic field 102. Referring to FIG. 6, the blocks of a compensation network for voltages coupled into the velocity sensing loop 116 by current changes in the voice coil 106 can be seen. Schematically represented are the voice coil windings 108 and the velocity sensing loop 116. A driver 140 provides a voltage across the voice coil 106 which causes a current to flow through the voice coil windings 108 thereby resulting in its movement along the elongated central member 92. A voltage output from the velocity sensing loop 116 is amplified by a velocity sensing loop amplifier 142 designated as $A_1$. In addition, a signal proportional to the voltage across the voice coil 106 is provided by the driver 140 to a voice coil voltage amplifier 144 designated as $A_2$. A voltage proportional to the current supplied by the driver 140 to the voice coil 106 is supplied through a differentiation circuit 148 and associated amplifier 150 designated as $A_3$. Outputs of the three amplifiers 142, 144 and 150 are summed in a summing network 152, the output of which is provided to the voice coil driver 140. It has been found that non-linearities in the voice coil driver 140 due to a relative large output current requires that voltages proportional to both the voltage across the voice coil 106 and the rate of change of current through the voice coil 106 are required in order to cancel voltages induced in the velocity sensing loop 116 by current changes in the voice coil 106. The voice coil voltage amplifier 144 and differentiation amplifier 150 are inverting amplifiers which provide output voltages having opposite polarities to that of the velocity sensing loop amplifier 142. The voice coil voltage amplifier 144 and differentiation amplifier 150 have level adjusting potentiometers 154 and 156 respectively. An empirical adjustment of the two potentiometers 154 and 156 provide a corrected voltage from the summing network 152 which is only proportional to velocity sensing loop 116 velocity through the magnetic field 102. The empirical adjustments required are determined by saturation characteristics of the voice coil driver 140.

Figure 7:
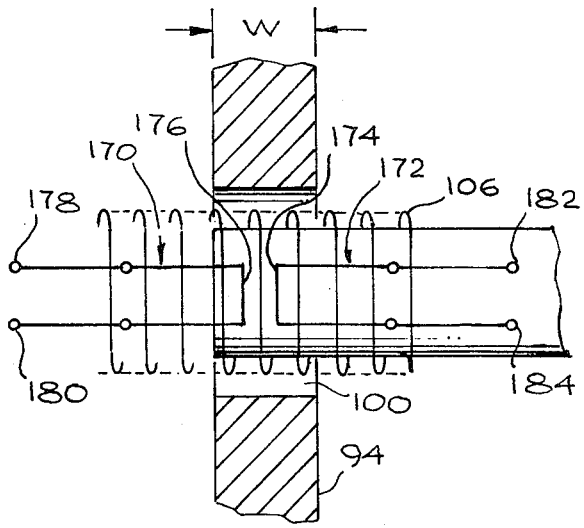
FIG. 7 is a diagramatic representation of a further embodiment of the present invention in which two velocity sensing loops are utilized.
Figure 8:
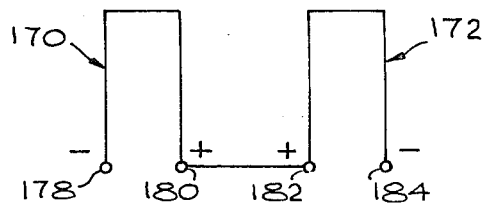
FIG. 8 shows the interconnection of the two velocity sensing loops shown in FIG. 7.

A further feature according to the invention is shown in FIG. 7. A first velocity sensing loop 170 is mounted the same as the velocity sensing loop 116 as previously described, and a second velocity sensing loop 172, identical in configuration to the first loop 170, is mounted so that its end portion 174 is opposite the end portion 176 of the first loop 170. The sides of the second velocity sensing loop 172 are colinear with but extend oppositely to those of the first loop 170. The velocity sensing loops 170 and 172 are positioned on the voice coil 106 surface, the surface being represented by dotted lines. However, the loops 170 and 172 need only be carried by the voice coil 106 through the magnetic field 102, and it is not necessary that the loops be entirely positioned on the voice coil 106 surface. It is important that both sensing loop end portions 174 and 176 are within the width W as the offset 62 is passing over the first positioning finger 68 so that identical voltages proportional to the velocity of the two velocity sensing loops 170 and 172 appear at their respective output terminals 178, 180 and 182, and 184. These voltages are of equal magnitude but have opposite polarity because the magnetic field enclosed by one sensing loop is increasing while the magnetic field enclosed by the other is decreasing, the rate of change for both being the same however. If the terminals of the two velocity sensing loops 170 and 172 are interconnected as shown in FIG. 8, the voltage across the negative terminal 178 of the first velocity sensing loop 170 with respect to the voltage across the positive terminal 184 of the second velocity sensing loop 172, created by movement of the two loops 170 and 172 through the magnetic field 102, will be twice the voltage appearing across either loop alone. However, voltages produced by mutual inductance in the velocity sensing loops 170 and 172 due to current changes in the voice coil 106 have the same polarity since each loop 170 and 172 will be affected in the same way by the current change. Thus, by connecting the two loops 170 and 172 in series so that the positive terminal 180 of the first loop 170 is connected to the negative terminal 182 of the second loop 172, identical voltages having the same polarity which appear in each sensing loop 170 and 172 will almost cancel each other, thereby providing an output voltage across the two output terminals 178 and 184 which is a function of the sensing loop velocity through the magnetic field 102. Voltages of the same polarity generated within the two velocity sensing loops 170 and 172 will almost cancel each other. If the end portions 176 and 174 of the first velocity sensing loop 170 and the second velocity sensing loop 172 respectively, as shown in FIG. 7, are within the magnetic field width W during the time the offset 62 is passing over the first positioning finger 68, then the voltage output of the two loop combination when interconnected as shown in FIG. 8 will be twice that obtained with a single loop. The two velocity sensing loops 170 and 172, configured as above-described, provide an output voltage having an improved signal-to-noise ratio while at the same time reducing the need for a compensation system to cancel voltages coupled into the velocity sensing loops 170 and 172 by current changes in the voice coil 106.

From the foregoing it should be understood that in a linear motor having a voice coil supported in a magnetic field and mounted so that a current through the voice coil will develop a force to cause the voice coil to move linearly, a loop of wire physically carried by the voice coil through the magnetic field will cause a voltage to be developed across its terminals which is proportional to the velocity of the voice coil through the magnetic field.

What is claimed is:
1. A linear motor comprising:

a permanent magnet core including an annular outer member and an elongated central member respectively defining spaced first and second pole faces, said core producing a substantially uniform magnetic field across an air gap defined between said spaced pole faces;

a voice coil comprising a multiple turn electrical conductor physically configured as a cylindrical hollow wall structure, said structure supported around said core central member, at least partially within said air gap, for movement along a linear path coincident with the axis of said coil and the elongated direction of said central member and substantially perpendicular to said magnetic field;

drive means electrically connected to said voice coil for supplying a drive current thereto to interact with said magnetic field for developing a force on said hollow wall structure to move it along said linear path a first sensing loop comprising an electrical conductor mounted on and contoured to the peripheral surface of said hollow wall structure, said first sending loop defining an axis extending substantially perpendicular to said voice coil axis and including a conductor portion within said magnetic field; and circuit means responsive to a voltage produced by said first sensing loop as said hollow wall structure carries said conductor portion through said magnetic field for controlling the drive current supplied to said voice coil.

2. The apparatus of claim 1 wherein said circuit means includes means sensing a change of current in said voice coil for compensating for current changes induced thereby in said first sensing loop.

3. The apparatus of claim 1 including a second sensing loop comprising an electrical conductor mounted on and conforming to the outer surface of said hollow wall structure and defining an axis extending perpendicular to said voice coil axis, said second sensing loop including a conductor portion within said air gap extending substantially perpendicular to said magnetic field; and means electrically interconnecting said first and second sensing loops for cancelling signals induced therein attributable to current changes in said voice coil and for adding signals induced therein attributable to motion through said magnetic field.

4. The apparatus of claim 3 wherein said circuit means further includes means sensing a change of current in said voice coil for compensating for current changes induced thereby in said first and second sensing loops.

* * * * *